(12) United States Patent
Yang et al.

(10) Patent No.: US 7,313,004 B1
(45) Date of Patent: Dec. 25, 2007

(54) SWITCHING CONTROLLER FOR RESONANT POWER CONVERTER

(75) Inventors: Ta-Yung Yang, Milpitas, CA (US); Chien-Yuan Lin, Pan-Chiao (TW); Kuang-Chih Shih, Taipei (TW); Wei-Ting Wang, Ciaotou Township, Kaohsiung County (TW)

(73) Assignee: System General Corp., Taipei (TW)

( * ) Notice: Subject to any disclaimer, the term of this patent is extended or adjusted under 35 U.S.C. 154(b) by 0 days.

(21) Appl. No.: 11/614,971

(22) Filed: Dec. 21, 2006

(51) Int. Cl.
*H02M 3/335* (2006.01)
(52) U.S. Cl. ..................... 363/21.02; 363/97
(58) Field of Classification Search .................. 363/16, 363/21.02, 21.03, 39, 40, 41, 56.01, 95, 97
See application file for complete search history.

(56) References Cited

U.S. PATENT DOCUMENTS

| | | | |
|---|---|---|---|
| 4,535,399 A | 8/1985 | Szepesi | |
| 4,541,041 A | 9/1985 | Park et al. | |
| 4,631,652 A | 12/1986 | Wendt | |
| 4,814,962 A * | 3/1989 | Magalhaes et al. | ........... 363/16 |
| 5,768,112 A * | 6/1998 | Barrett | ........... 363/16 |
| 6,018,467 A * | 1/2000 | Majid et al. | ........... 363/16 |
| 6,927,607 B2 * | 8/2005 | Choi et al. | ........... 327/108 |

* cited by examiner

*Primary Examiner*—Adolf Berhane

(57) ABSTRACT

An integrated control circuit for a resonant power converter includes a minimum-frequency programming circuit connected a first resistor to program a minimum switching frequency of the power converter. A feedback circuit is coupled to a feedback terminal to receive a feedback signal for generating an adjustment signal. A maximum-frequency programming circuit connects a second resistor to determine a maximum switching frequency in response to the adjustment signal. An oscillator is coupled to the minimum-frequency programming circuit and the maximum-frequency programming circuit to generate an oscillation signal for determining the switching frequency of the power converter. A feed-forward circuit is connected to a feed-forward terminal to receive a feed-forward signal represents the input voltage of the power converter. The switching frequency is increased in response to decrease of the feedback signal, and the switching frequency is increased in response to the increase of the feed-forward signal.

22 Claims, 9 Drawing Sheets

SWITCHING CONTROLLER FOR RESONANT POWER CONVERTER

BACKGROUND OF THE INVENTION

1. Field of Invention

The present invention relates to resonant power converters, and more particularly to the control circuit of the resonant power converter.

2. Description of Related Art

Power converters are used to convert an unregulated power source to a constant power source. A power converter normally includes a transformer having primary and secondary winding to provide the isolation. Switching devices connected in the primary winding control energy transferring from the primary winding to the secondary winding. The power converters operate at high frequencies allows a size and weight reduction. However, the switching losses, component stresses, and electric-magnetic-interference (EMI) are inherent problems. In the last decades, many resonant power converters have been proposed for high frequency power conversion to reduce the switching losses. Among them, the resonant switching techniques are described in following prior arts: "Regulated switched power circuit with resonant load" by Tamas S. Szepesi, U.S. Pat. No. 4,535,399; "Frequency controlled resonant regulator" by Frank S. Wendt, U.S. Pat. No. 4,631,652.

For the power saving at no load, a burst switching schemes is developed for resonant power control, "Full load to no-load control for a voltage fed resonant inverter" by John N. Park and Robert L. Steigerwald, U.S. Pat. No. 4,541,041. In various resonant power converters, the leakage inductance of the transformer or additional magnetic components is employed as a resonant inductor to generate the circulating current for achieving the soft switching.

However, there still exist several drawbacks in conventional technologies. The resonant inductor associated with a resonant capacitor forms a resonant circuit for the power converter to deliver the maximum power to the load. Although the switching frequency of the power converter is controlled to higher or lower than the resonant frequency in response to the change of the load, the change of the switching frequency must be restricted to ensure the linear operation and achieve the soft switching of the resonant power converter. Furthermore, the poor audio-susceptibility of the power converter and the acoustic noise of the burst switching are disadvantages. These shortcomings are the main object of the present invention to overcome.

SUMMARY OF THE INVENTION

One of the objects of the invention is to provide an integrated controller for a resonant power converter. The range of the switching frequency can be determined to achieve the linear operation of the power converter. An independent feedback terminal is coupled to the output of the power converter to receive a feedback signal through an optical-coupler. The switching frequency is thus modulated in accordance with the feedback signal to regulate the output of the power converter. A minimum-frequency programming circuit is connected to a first resistor to program a minimum switching frequency of the power converter. A feedback circuit is coupled to the feedback terminal to receive the feedback signal for generating an adjustment signal. A maximum-frequency programming circuit is connected to a second resistor to determine a maximum switching frequency in response to the adjustment signal. An oscillator is coupled to the minimum-frequency programming circuit and the maximum-frequency programming circuit to generate an oscillation signal for regulating the switching frequency of the power converter. A feed-forward circuit is connected to a feed-forward terminal to receive a feed-forward signal that represents the input voltage of the power converter. The feed-forward signal is applied to modulate the oscillation signal to improve the audio-susceptibility of the power converter without going through the feedback loop of the power converter. The switching frequency is increased in response to decrease of the feedback signal, and the switching frequency is increased in response to the increase of the feed-forward signal. Furthermore, a power management circuit is developed to generate a burst signal to on/off the switching signal of the power converter for light load conditions. The burst signal is generated once the feedback signal is lower than a light-load threshold. The light-load threshold is determined by a power-level signal. The duty cycle of the burst signal is linearly modulated in response to the change of the feedback signal for power saving. Additionally, the burst signal is disabled if the frequency of the burst signal will be operated in audio band, which reduce the acoustic noise of the power converter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
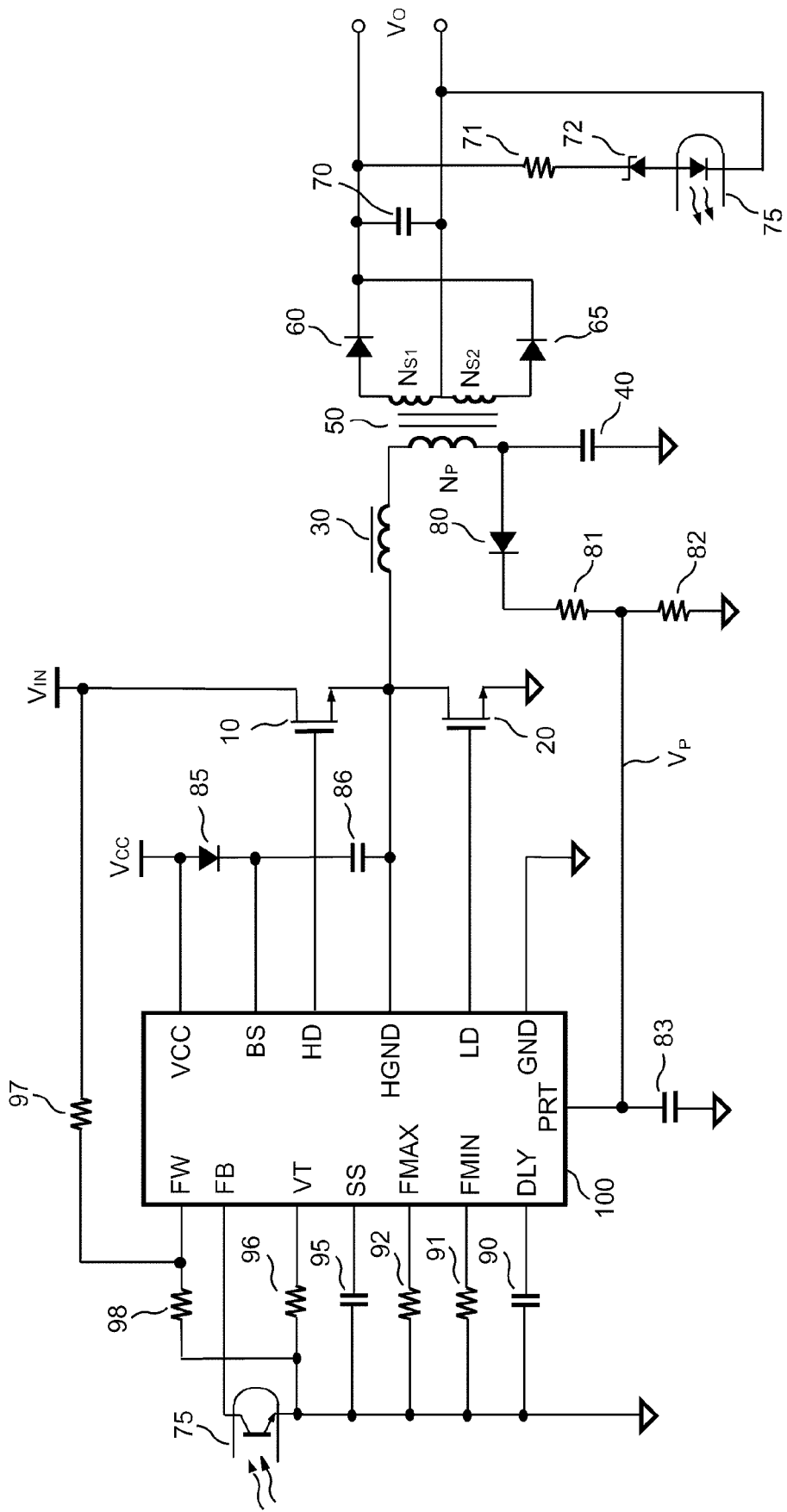
FIG. 1 shows a resonant power converter including a switching controller in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a resonant power converter including a switching controller 100 to control power switches 10 and 20. The power switch 10 is connected to the input voltage $V_{IN}$ of the power converter. The power switch 20 is connected to the ground. Power switches 10 and 20 form a half bridge circuit to switch the primary winding $N_P$ of a transformer 50 through a series resonant circuit. An inductance device 30 and a capacitor 40 develop the resonant circuit. A maximum power is delivered to the secondary windings $N_{S1}$, $N_{S2}$ of the transformer 50 when the switching frequency of power switches 10, 20 is operated at the resonant frequency $f_0$ of the resonant circuit.

$$f_0 = \frac{1}{2\pi\sqrt{L_{30} \times C_{40}}} \quad (1)$$

The secondary windings $N_{S1}$, $N_{S2}$ are further coupled to generate the output voltage $V_O$ of the power converter through rectifiers 60, 65 and capacitor 70. An optical coupler 75 is coupled to the output voltage $V_O$ via a resistor 71, a regulator circuit 72 to generate a feedback signal. A feedback terminal FB of the switching controller 100 is connected to the optical coupler 75 to receive the feedback signal for regulating the output voltage $V_O$. A diode 85 and a capacitor 86 form a charge-pump circuit connected to a bootstrap terminal BS and a bootstrap-ground terminal HGND for providing a power source to a high-side driver circuit of the switching controller 100. The high-side driver circuit is used to drive the power switch 10 via a HD terminal. A low-side driver circuit is utilized to drive the power switch 20 through a LD terminal. A diode 80, a capacitor 83 and resistors 81, 82 develop a detection circuit to detect the voltage of the capacitor 40. A higher voltage will be generated at the capacitor 40 if the output of the power converter is short circuit. A voltage signal $V_P$ detected by the detection circuit is connected to a protection input terminal PRT. When the voltage signal $V_P$ is higher than an over-voltage threshold, the switching controller 100 will initial a delay time. A capacitor 90 connected to a time-delay programming terminal DLY to determine the period of the delay time. Power switches 10, 20 will be turned off to protect the power converter once the delay time is expired.

A resistor 91 is connected to a minimum-frequency programming terminal $F_{MIN}$ to determine a minimum switching frequency of the power converter. A resistor 92 is connected to a maximum-frequency programming terminal $F_{MAX}$ to determine a maximum switching frequency of the power converter. A capacitor 95 is connected to a soft-start terminal SS to generate a soft-start signal in response to the charge of the capacitor 95. The soft-start signal will adjust the switching frequency to limit the power transfer to the output of the power converter during the power on stage. A resistor 96 is connected to a power-level programming terminal VT to generate a power-level signal $V_T$. The power-level signal $V_T$ is used to determine a light-load threshold for generating a burst signal in response to the feedback signal. The burst signal performs a burst switching for the power converter to save power. Besides, a resistor 97 is connected from the input voltage $V_{IN}$ to a feed-forward terminal FW of the switching controller 100. A resistor 98 is connected from the feed-forward terminal FW to ground. Resistors 97, 98 form a voltage divider to generate a feed-forward signal that represents the input voltage $V_{IN}$. The feed-forward signal is coupled to modulate the switching frequency of the power converter. The switching frequency is increased in response to the increase of the feed-forward signal, which improves the audio-susceptibility of the power converter without going through the feedback of the power converter.

In the embodiment, the resonant power converter does not utilize leakage inductance of the transformer 50 or other magnetic components to achieve soft switching. Several embodiments will be described below.

Figure 2:
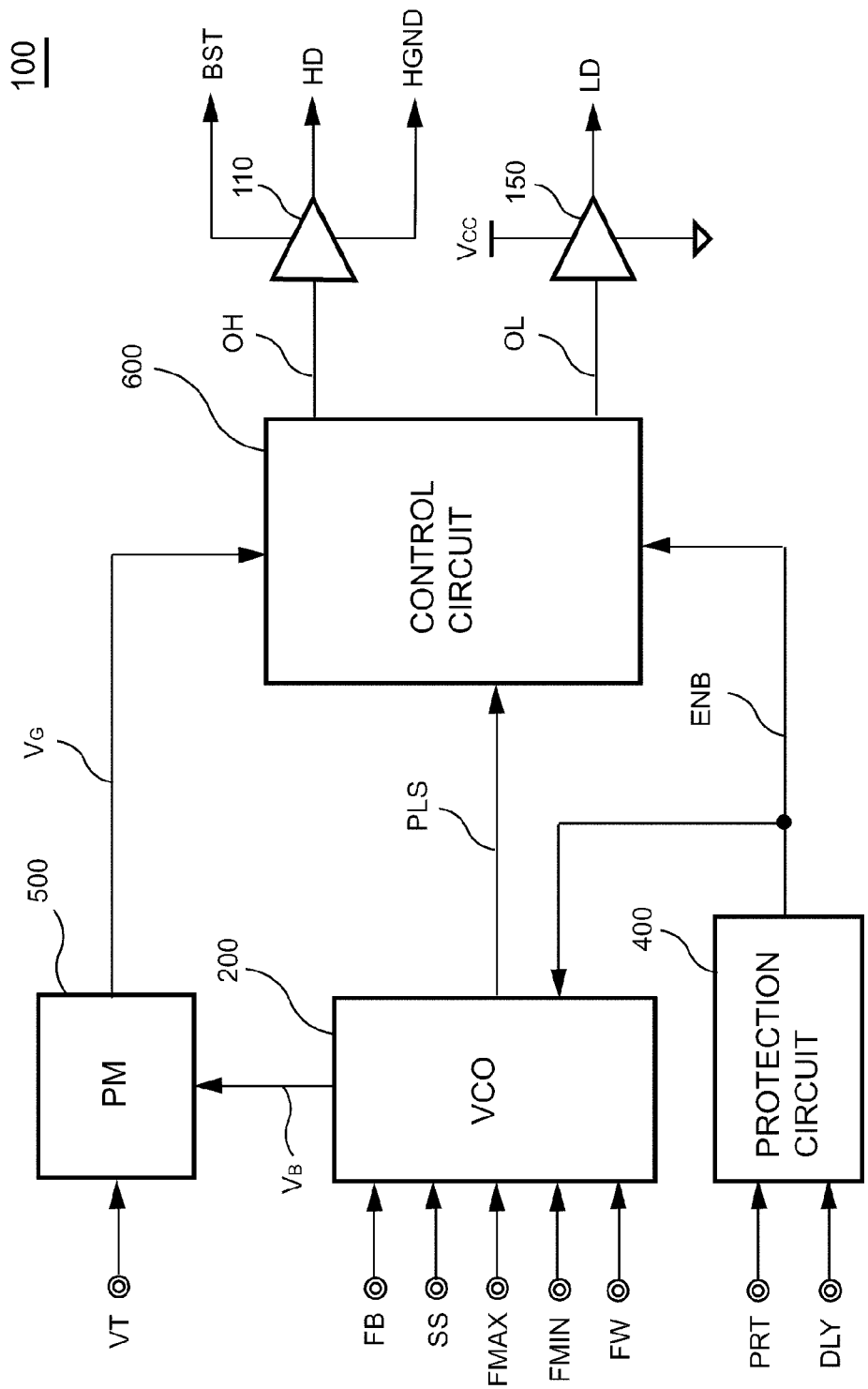
FIG. 2 is a preferred embodiment of a switching controller according to the present invention.

FIG. 2 shows a preferred embodiment of a switching controller 100 according to the present invention. The switching controller 100 includes a voltage-control-oscillator (VCO) 200, a protection circuit 400, a power-management circuit (PM) 500, a control circuit 600 and drive circuits 110, 150. The voltage-control-oscillator 200 is connected to the feedback terminal FB, the soft-start terminal SS, the maximum-frequency programming terminal FMAX, the minimum-frequency programming terminal FMIN and the feedforward terminal FW to generate an oscillation signal PLS. The oscillation signal PLS is used to determine the switching frequency of the power converter. The protection circuit 400 is connected to the protection input terminal PRT and the time-delay programming terminal DLY to generate an enable-signal ENB. The power-management circuit 500 is coupled to the feedback terminal FB and the power-level programming terminal VT to generate the burst signal $V_G$. The control circuit 600 receives the oscillation signal PLS, the burst signal $V_G$ and the enable-signal ENB for generating switching signals OL and OH. The switching signal OL is connected to the low-side driver circuit 150 to drive the power switch 20. The switching signal OH is connected to the high-side driver circuit 110 drive the power switch 10 through the HD terminal.

Figure 3:
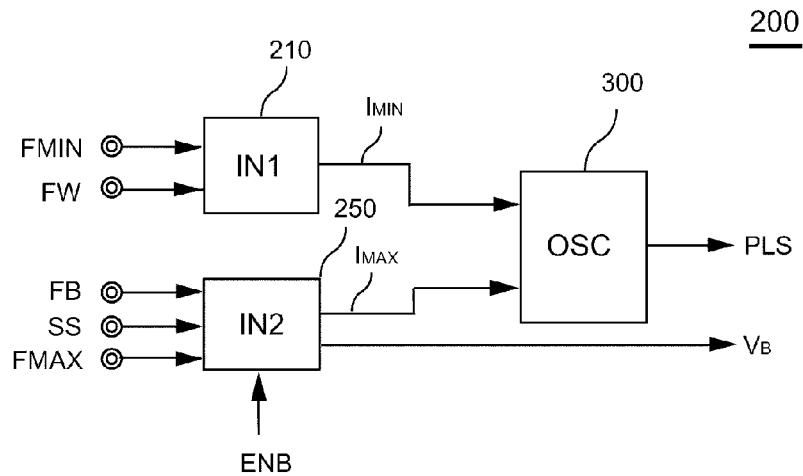
FIG. 3 is a block diagram of a voltage-control oscillator in accordance with the present invention.

FIG. 3 shows the block diagram of the voltage-control oscillator 200. It includes a minimum-current generation circuit (IN1) 210 connected to the minimum-frequency programming terminal $F_{MIN}$ and the feed-forward terminal FW to generate a minimum current signal $I_{MIN}$. A maximum-current generation circuit (IN2) 250 is connected to the maximum-frequency programming terminal $F_{MAX}$, the soft-start terminal SS and the feedback terminal FB to generate a maximum current signal $I_{MAX}$. An oscillation circuit (OSC) 300 is coupled to the minimum-current generation circuit 210 and the maximum-current generation circuit 250 to receive the minimum current signal $I_{MIN}$ and the maximum current signal $I_{MAX}$ for generating the oscillation signal PLS.

Figure 4:
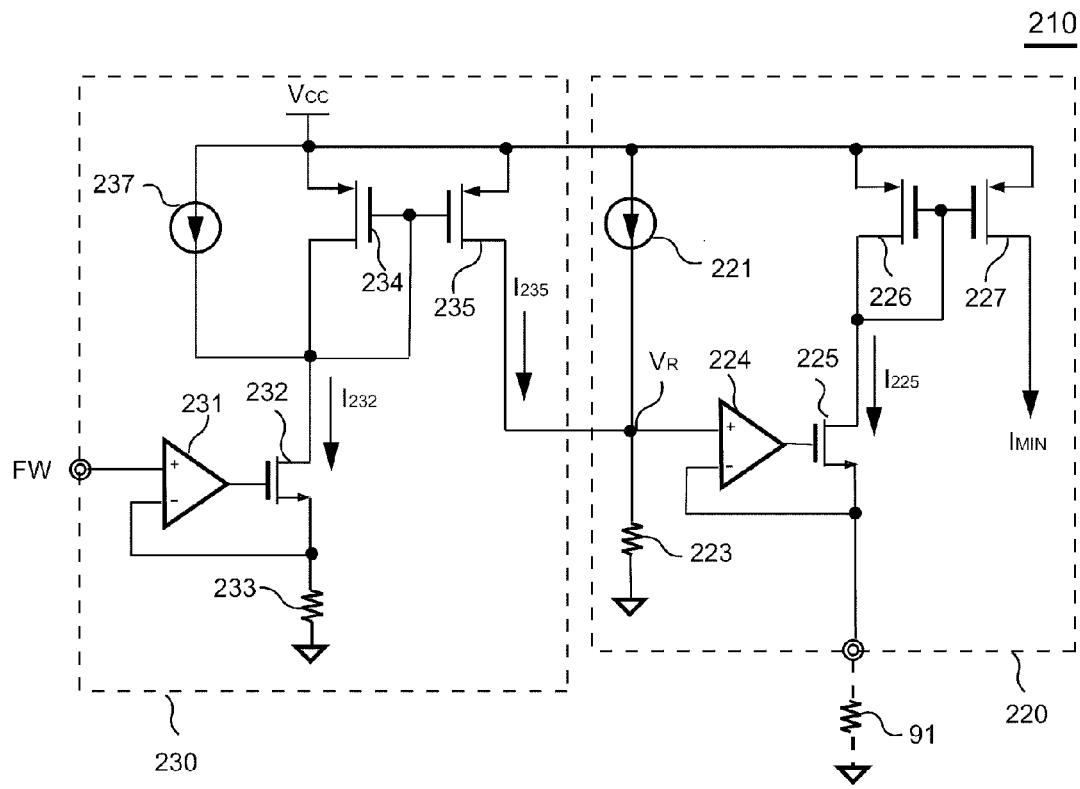
FIG. 4 shows a minimum-current generation circuit in accordance with the present invention.

FIG. 4 shows the minimum-current generation circuit 210. It includes a minimum-frequency programming circuit 220 and a feed-forward circuit 230. The feed-forward circuit 230 includes an operational amplifier 231, a resistor 233, a current source 237 and transistors 232, 234, 235. The operational amplifier 231 associates with the transistor 232 and the resistor 233 forms a voltage-to-current converter to generate a current $I_{232}$ in response to the feed-forward signal. The current $I_{232}$ and the current source 237 are connected to transistors 234 and 235. Transistors 234 and 235 develop a current mirror to generate a current $I_{235}$ in response to the current $I_{232}$ and the current of the current source 237. The current source 237 provides a threshold to produce the current $I_{235}$. The current $I_{235}$ is generated once the current $I_{232}$ is higher than the current of the current source 237.

The minimum-frequency programming circuit 220 includes a current source 221, a resistor 223, an operational amplifier 224 and transistors 225, 226, 227. The current $I_{235}$ of the feed-forward circuit 230 is connected to the current source 221 to generate a reference signal $V_{R1}$ at the resistor 223. The reference signal $V_{R1}$ is connected to the operational amplifier 224 to generate a current signal $I_{225}$ at the transistors 225 in accordance with the resistance of the resistor 91. Transistors 226, 227 form a current mirror to generate the minimum current signal $I_{MIN}$ in response to the current $I_{225}$.

Figure 5:
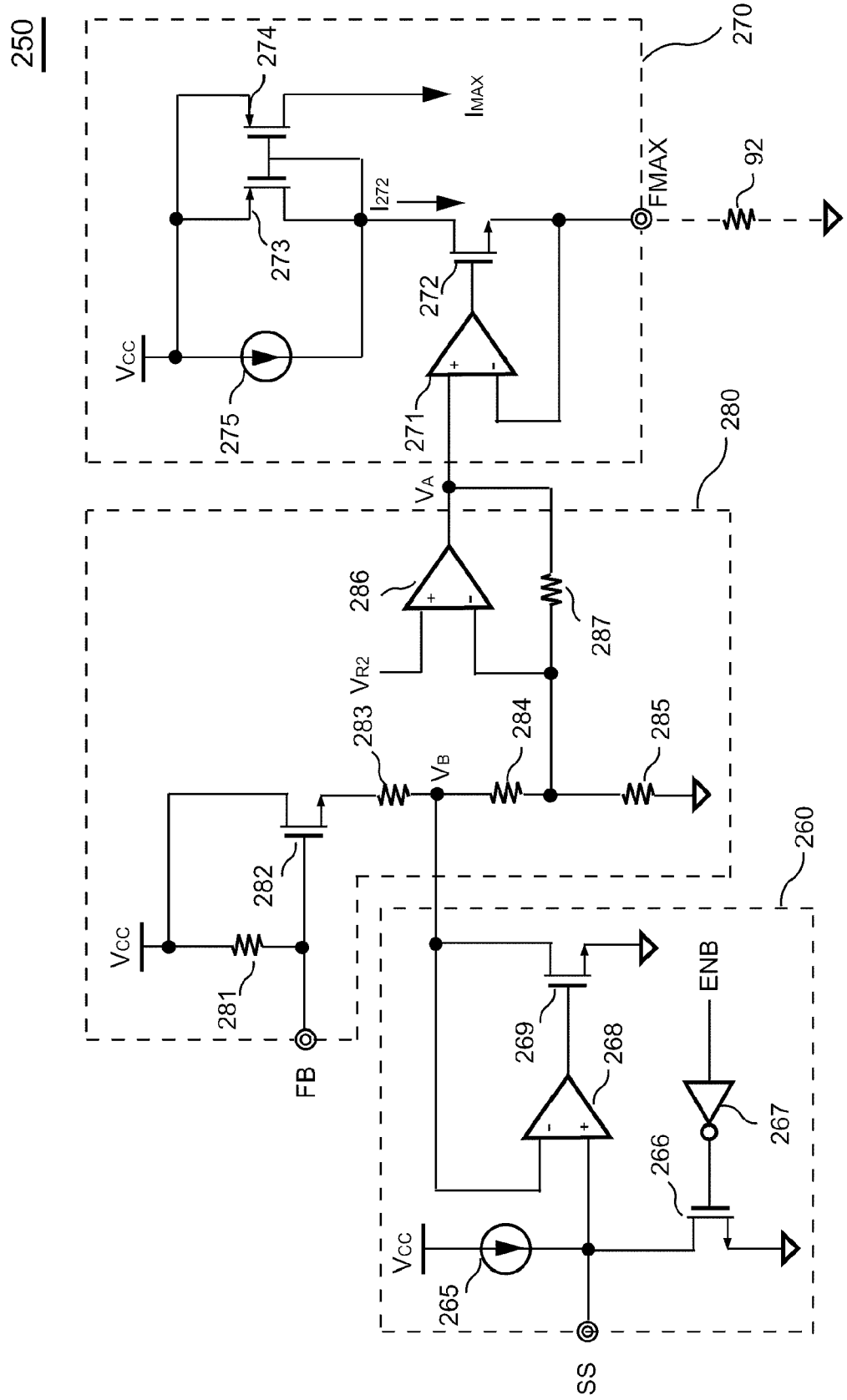
FIG. 5 shows a maximum-current generation circuit in accordance with the present invention.

FIG. 5 shows a maximum-current generation circuit 250. It includes a soft-start circuit 260, a feedback circuit 280 and a maximum-frequency programming circuit 270. A current source 265, an operational amplifier 268, an inverter 267 and transistors 266, 269 form the soft-start circuit 260. The current source 265 is connected to the soft-start terminal SS to charge the capacitor 95 and generate the soft-start signal. The transistor 266 is connected to the soft-start terminal SS to discharge the capacitor 95 once the enable-signal ENB is disabled. The transistor 266 is controlled by the enable-signal ENB through the inverter 267. The operational amplifier 268 and the transistor 269 are connected as an open-drain buffer to receive the soft-start signal.

A transistor 282, an operational amplifier 286 and resistors 281, 283, 284, 285, 287 develop the feedback circuit 280. The resistor 281 is connected to the feedback terminal FB to provide a power source to the optical-coupler 75 for generating the feedback signal. The transistor 282 is connected to the feedback terminal FB to generate a level-shift signal $V_B$ in accordance with the feedback signal. Resistors 283, 284 and 285 are connected in series to provide attenuation for the level-shift signal $V_B$. The resistor 283 is connected to the level-shift signal $V_B$. The resistor 285 is connected to ground. The join of resistors 283, 284 is coupled to the output of the open-drain buffer. The join of resistors 284, 285 is coupled to the negative input of the operational amplifier 286. A reference voltage $V_{R2}$ supplies the positive input of the operational amplifier 286. The resistor 287 is connected to build the operational amplifier 286 as inverse amplifier. The output of the operational amplifier 286 produces an adjustment signal $V_A$. The adjustment signal $V_A$ is thus generated in response to the feedback signal and the soft-start signal.

The maximum-frequency programming circuit 270 includes a current source 275, an operational amplifier 271 and transistors 272, 273, 274. The adjustment signal $V_A$ is connected to the operational amplifier 271 to generate a current signal $I_{272}$ at the transistors 272 in accordance with the resistance of the resistor 92. The current $I_{272}$ and the current source 275 are connected to transistors 273 and 274. Transistors 273 and 274 develop a current mirror to generate the maximum current signal $I_{MAX}$ in response to the current $I_{272}$ and the current of the current source 275. The current source 275 provides a threshold. Therefore, the maximum current signal $I_{MAX}$ is generated once the current $I_{272}$ is higher than the current of the current source 275.

Figure 6:
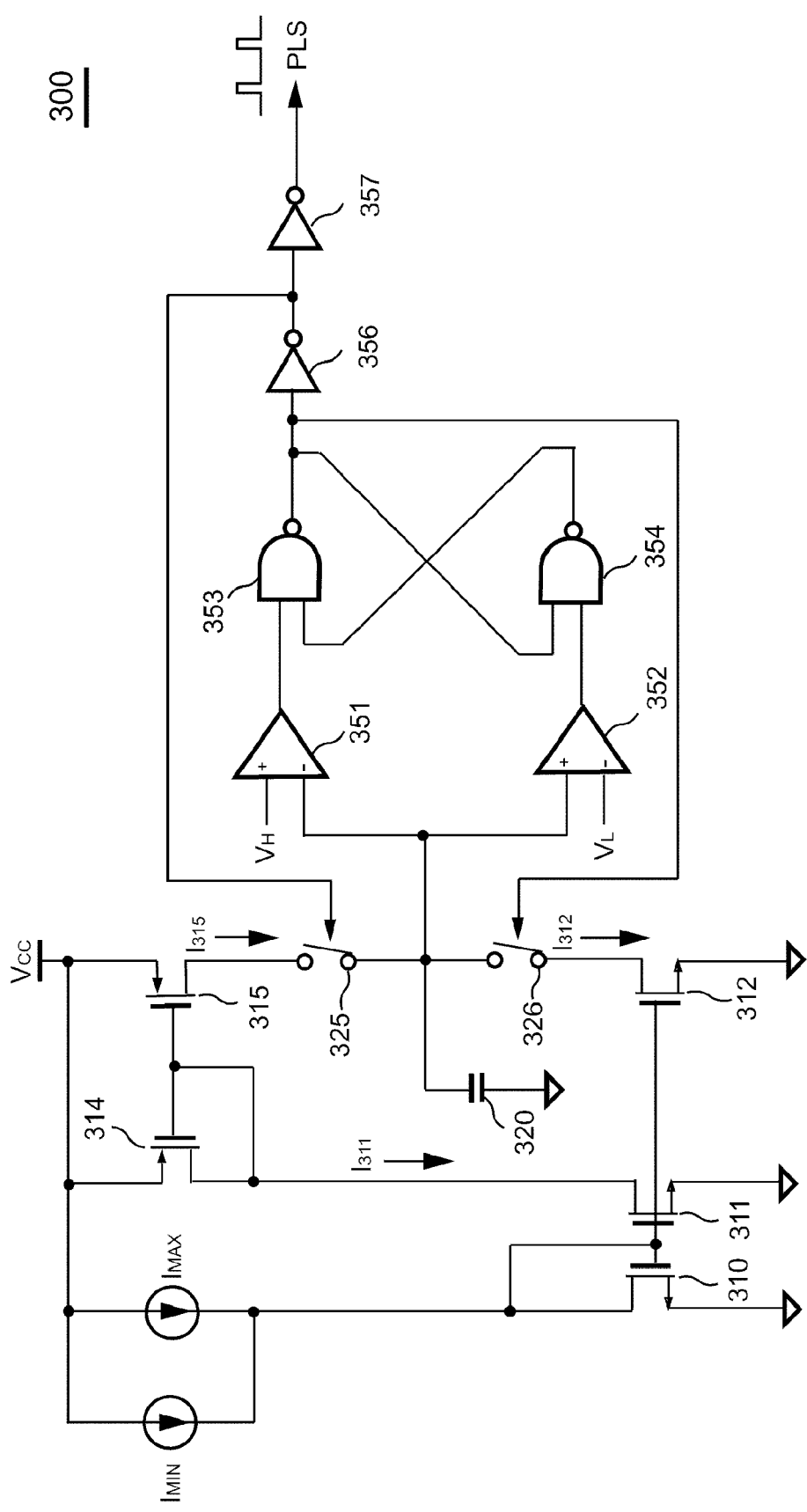
FIG. 6 shows an oscillation circuit in accordance with the present invention.

FIG. 6 shows the oscillation circuit 300. Transistors 310, 311 and 312 are connected as a current mirror to generate a current $I_{311}$ and a current $I_{312}$ in accordance with the minimum current signal $I_{MIN}$ and the maximum current signal $I_{MAX}$. Transistors 314 and 315 are connected as another current mirror to generate a current $I_{315}$ proportional to the current $I_{311}$. The current $I_{315}$ and the current $I_{312}$ are coupled to charge a capacitor 320 through a switch 325 and a switch 326 respectively. The capacitor 320 is connected to the negative input of a comparator 351 and the positive input of a comparator 352. The positive input of the comparator 351 and the negative input of the comparator 352 are connected to trip-point voltages $V_H$ and $V_L$ respectively. The output of the comparator 351 and the output of the comparator 352 are connected to NAND gates 353 and 354. NAND gates 353 and 354 are connected as a latch circuit. The output of the NAND 353 is used to control the on/off of the switch 326. The output of the NAND 353 is utilized to control the on/off of the switch 325 via an inverter 356. The output of the inverter 356 is further connected to an inverter 357. The output of the inverter 357 generates the oscillation signal PLS to determine the switching frequency of the power converter. The switching frequency is increased in response to decrease of the feedback signal. The switching frequency is increased in response to the increase of the feed-forward signal.

Figure 7:
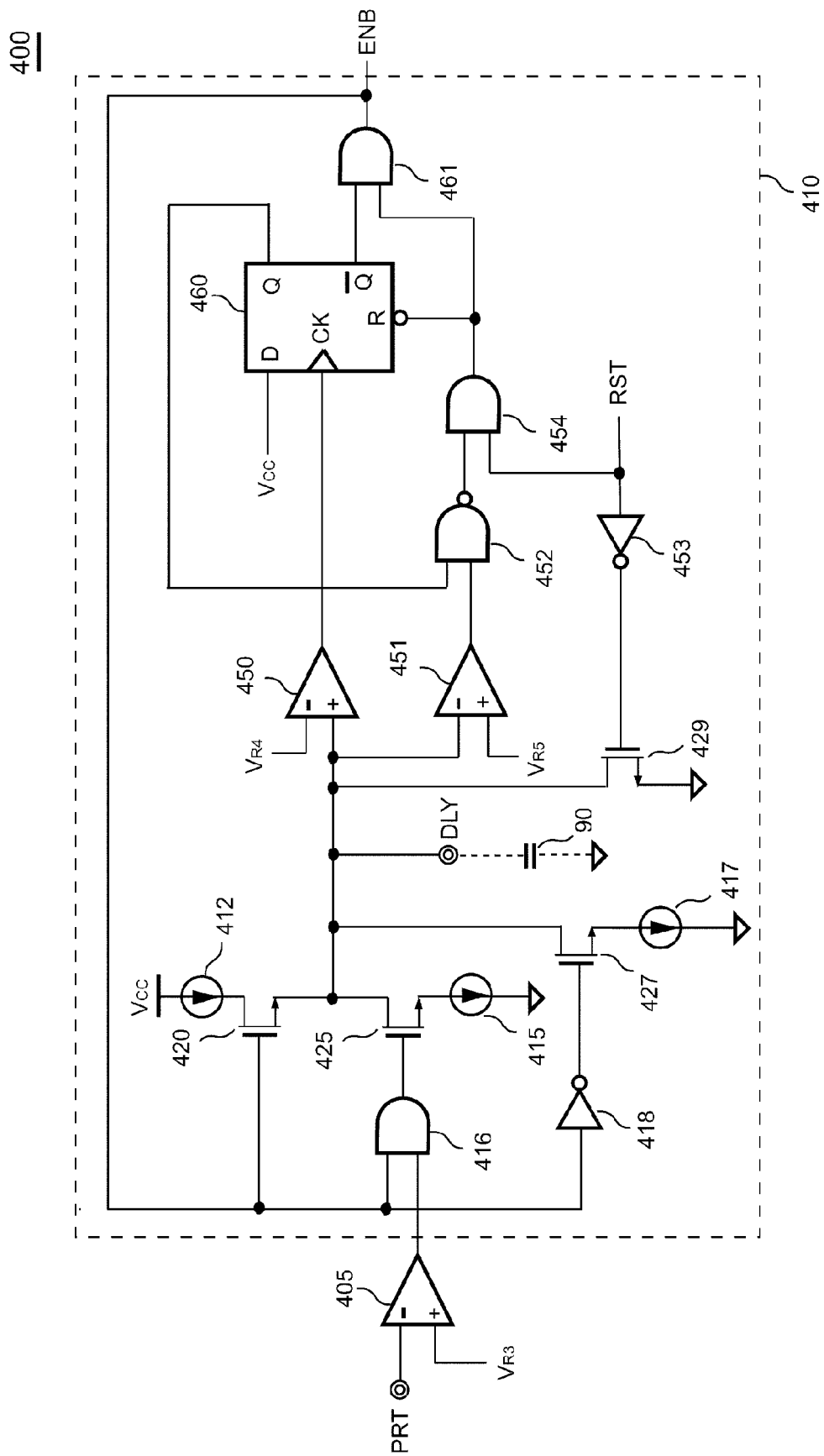
FIG. 7 is a protection circuit with programmable time delay in accordance with the present invention.

FIG. 7 shows the protection circuit 400. A comparator 405 and a threshold voltage $V_{R3}$ form a monitoring circuit coupled to the protection input terminal PRT to generate an over-voltage signal when the voltage of the protection input terminal PRT is higher than the threshold voltage $V_{R3}$. The over-voltage signal is coupled to a time-delay circuit 410 to initiate a charge time delay in response to the over-voltage signal. The time-delay circuit 410 will disable the enable-signal ENB to inhibit switching signals OH and OL once the charge time delay is expired. The charge time delay provides a debounce function for detecting of the over-voltage signal. The over-voltage signal is connected to an input of an AND gate 416. Another input of the AND gate 416 is connected to the enable-signal ENB. A current source 412 is coupled to charge the capacitor 90 through a transistor 420 and the time-delay programming terminal DLY. A current source 415 is coupled to discharge the capacitor 90 via a transistor 425 and the time-delay programming terminal DLY. The current $I_{415}$ of the current source 415 is higher than the current $I_{412}$ of the current source 412. For example, the current $I_{412}$ equals to 100 uA and the $I_{415}$ is 200 uA. Therefore, the capacitor 90 will be discharged by the current source 415 when the enable-signal ENB is enabled (logic-high) and the over-voltage signal is disabled. The capacitor 90 is further connected to a transistor 429. The transistor 429 is controlled by a power-on reset signal RST through an inverter 453. The capacitor 90 is therefore discharged during the power on stage of the power converter. Comparators 450 and 451 are coupled to detect the voltage of the capacitor 90 via the time-delay programming terminal DLY. The comparator 450 and the comparator 451 include trip-point voltage $V_{R4}$ and $V_{R5}$ respectively. The output of the comparator 450 is connected to activate a flip-flop 460. The /Q output of the flip-flop 460 is connected to an AND gate 461 to disable the enable-signal ENB when the voltage of the capacitor 90 is higher than the trip-point voltage $V_{R4}$.

The time delay circuit 410 will initiate a discharge time delay once the enable-signal ENB is disabled (logic-low). The enable-signal ENB will be automatically enabled after the discharge time delay is expired. A current source 417 is coupled to discharge the capacitor 90 through a transistor 427 and the time-delay programming terminal DLY. The enable-signal ENB is coupled to control the transistor 427 via an inverter 418. The capacitor 90 is thus discharged by the current source 417 once the enable-signal ENB is disabled. The current $I_{417}$ of the current source 417, such as 10 uA is lower than the current $I_{412}$. The capacitor 90 will be discharged by the current $I_{417}$ until the voltage of the capacitor 90 is lower than the trip-point voltage $V_{R5}$. The output of the comparator 451 is connected to an input of an NAND gate 452. Another input of the NAND gate 452 is connected to the enable-signal ENB. The output of the NAND gate 452 is connected to an AND gate 454. Another input of the AND 454 is coupled to the power-on reset signal RST. The output of the AND gate 454 is coupled to reset the flip-flop 460. The period of the discharge time delay is longer than the period of the charge time delay, which reduces the duty cycle of the power converter during the protection.

Figure 8:
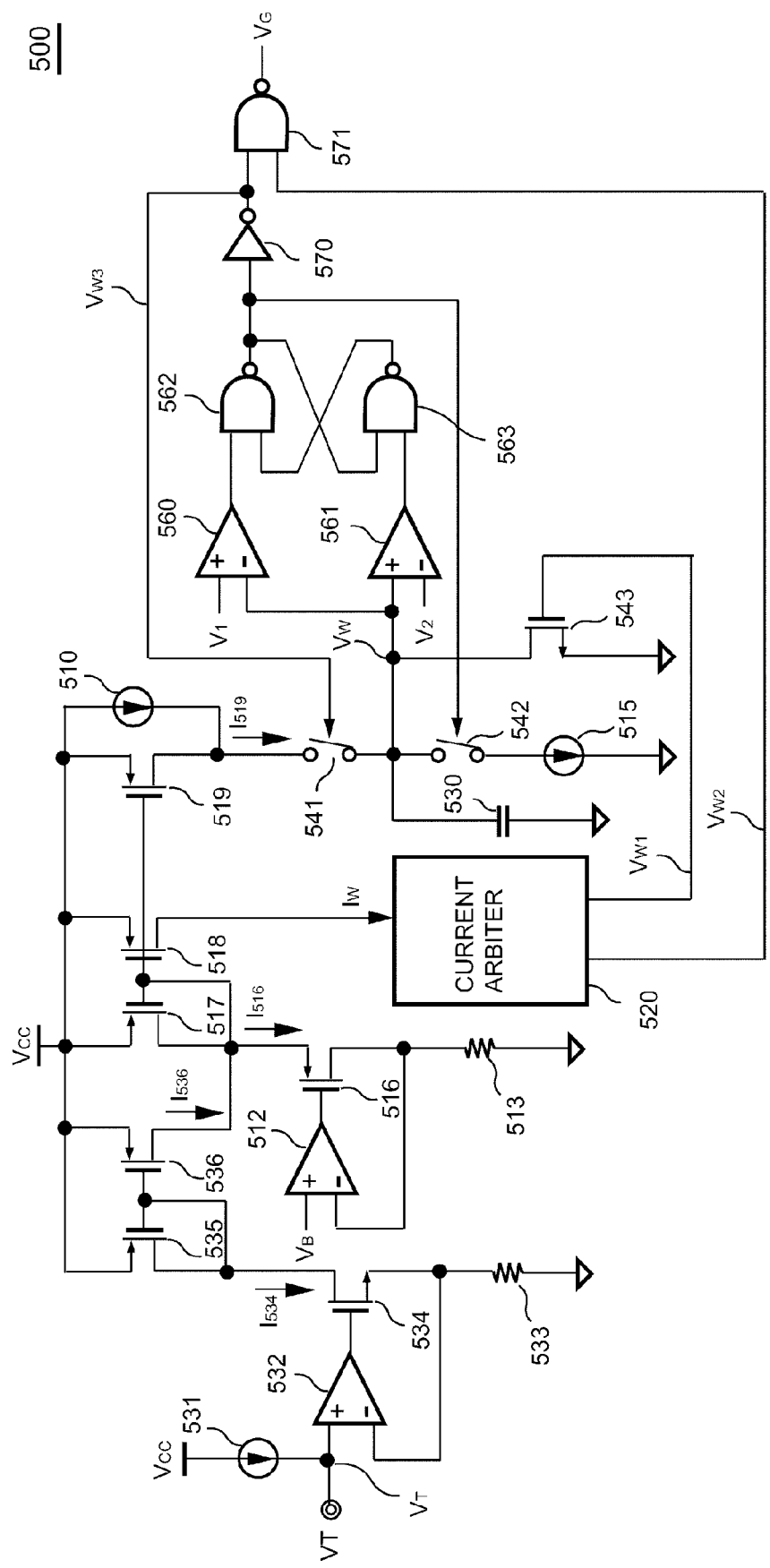
FIG. 8 shows a power management circuit for power saving.

FIG. 8 shows the power management circuit 500. The power management circuit 500 is coupled to the power-level programming terminal VT to receive the power-level signal $V_T$ for producing the light-load threshold and generating the burst signal $V_G$. A current source 531 is coupled to the power-level programming terminal VT. The current source 531 associated with the resistor 96 generate the power-level signal $V_T$ that is connected to an input of an operational amplifier 532. The operational amplifier 532, a resistor 533 and a transistor 534 develop a voltage-to-current converter to generate a current $I_{534}$ at the transistor 534 in accordance with the power-level signal $V_T$. The current $I_{534}$ is coupled to transistors 535, 536. Transistors 535 and 536 form a current mirror to generate a current $I_{536}$ at the transistor 536 in accordance the current $I_{534}$. The level-shift signal $V_B$ of the feedback circuit 280 is connected to the input of an operational amplifier 512. A transistor 516, a resistor 513 and the operational amplifier 512 develop another voltage-to-current converter to generate a current $I_{516}$ at the transistor 516 in response to the level-shift signal $V_B$. Transistors 517 and 518 develop a current mirror to generate a current $I_W$ at the transistor 518 and a current $I_{519}$ at the transistor 519 in response to the current $I_{536}$ and the current $I_{516}$. The current $I_W$ and the current $I_{519}$ can be expressed as, $$I_W = k2 \times \left[ \frac{V_B}{R_{513}} - \left(k1 \times \frac{V_T}{R_{533}}\right) \right] \quad (2)$$

$$I_{519} = k3 \times \left[ \frac{V_B}{R_{513}} - \left(k1 \times \frac{V_T}{R_{533}}\right) \right] \quad (3)$$

where k1 is the ratio of mirror transistors 535, 536; k2 is the ratio of mirror transistors 517, 518; k3 is the ratio of mirror transistors 517, 519; $R_{513}$ is the resistance of the resistor 513; $R_{533}$ is the resistance of the resistor 533.

The current $I_{519}$ and a current source 510 are coupled to charge a capacitor 530 via a switch 541. The current source 510 provides a minimum current to charge the capacitor 530. A current source 515 is further coupled to discharge the capacitor 530 through a switch 542. A ramp signal $V_W$ is therefore generated at the capacitor 530. The capacitor 530 is connected to the negative input of a comparator 560 and the positive input of a comparator 561. The positive input of the comparator 560 and the negative input of the comparator 561 are connected to trip-point voltages $V_1$ and $V_2$ respectively. The output of the comparator 560 and the output of the comparator 561 are connected to NAND gates 562 and 563. NAND gates 562 and 563 are connected as a latch circuit. The output of the NAND 562 is used to control the on/off of the switch 542. The output of the NAND 562 is utilized to control the on/off of the switch 541 via an inverter 570. The output of the inverter 570 is further connected to an NAND gate 571 to generate the burst signal $V_G$ at the output of the NAND gate 571. The enable time of the burst signal $V_G$ is fixed, which is determined by the current of the current source 515. The current $I_{519}$ and the current of the current source 510 determine the disable time of the burst signal $V_G$. Therefore, the disable time of the burst signal $V_G$ is modulated in response to the change of the feedback signal and the load of the power converter.

The current $I_W$ is coupled to a current arbiter 520 to generate control signals $V_{W1}$ and $V_{W2}$. The control signal $V_{W1}$ will be set to logic-high if the switching frequency of the burst signal $V_G$ will be fall into the audio band. The control signal $V_{W1}$ is coupled to disable the burst signal $V_G$ by reset the capacitor 530 via a transistor 543. The control signal $V_{W2}$ will be set to logic-low when the feedback signal is higher than the light-load threshold. The control signal $V_{W2}$ is connected to another input of the NAND gate 571 to enable the burst signal $V_G$. The burst signal $V_G$ is coupled to turn off switching signals OH and OL when the burst signal $V_G$ is disabled (logic-low).

Figure 9:
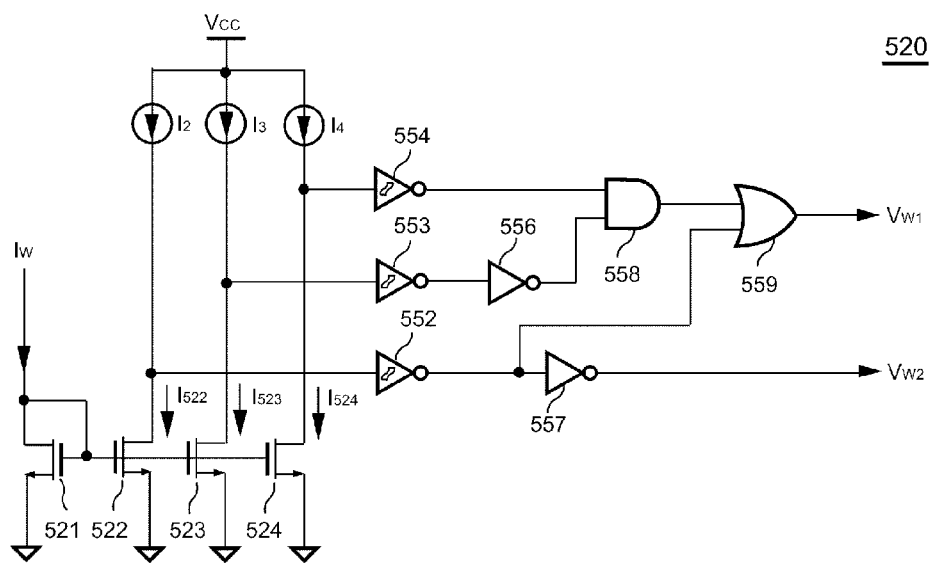
FIG. 9 is the circuit schematic of a current arbiter for deciding the on/off of the burst signal.

FIG. 9 shows the circuit schematic of the current arbiter 520. The current $I_W$ flows into a transistor 521. Transistors 521, 522, 523 and 524 develop current mirror to generate currents $I_{522}$, $I_{523}$ and $I_{524}$ in response to the current $I_W$. A current source $I_2$ and an inverter 552 are connected to compare with the current $I_{522}$. A current source $I_3$ and an inverter 553 are connected to compare with the current $I_{523}$. A current source $I_4$ and an inverter 554 are connected to compare with the current $I_{524}$. An inverter 557 is connected to the output of the inverter 552 to generate the control signal $V_{W2}$. The output of the inverter 552 is further connected to an input of an OR 559. An input of an AND gate 558 is connected to the inverter 554. Another input of the AND gate 558 is connected to the inverter 553 through an inverter 556. The output of the AND gate 558 is connected to another input of the OR gate 559. The output of the OR gate 559 generates the control signal $V_{W1}$. When the feedback signal is higher than the light-load threshold, the current $I_{522}$ will be higher than the current of the current source $I_2$. Meanwhile, a logic-low will be generated at the input of the inverter 552. When the frequency of the burst signal $V_G$ is lower than a first frequency, the current $I_{523}$ will be lower than the current of the current source $I_3$. A logic-high will be generated at the input of the inverter 553 When the frequency of the burst signal $V_G$ is higher than a second frequency, the current $I_{524}$ will be higher than the current of the current source $I_4$. A logic-low will be generated at the input of the inverter 554.

Figure 10:
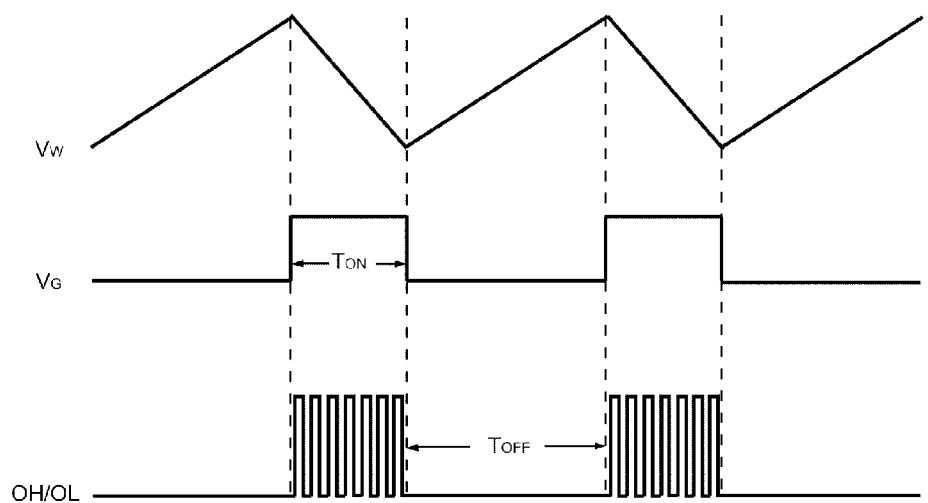
FIG. 10 shows waveforms of the power management circuit according to the present invention.

Therefore, the burst signal $V_G$ is generated once the feedback signal is lower than the light-load threshold. The light-load threshold is programmed by the power-level signal $V_T$. The burst signal $V_G$ is coupled to on/off switching signals OL and OH. The burst signal $V_G$ will be disabled to reduce the acoustic noise when the frequency of the burst signal $V_G$ may operate in between the first frequency and the second frequency. The frequency between the first frequency and the second frequency is the audio band such as 500 Hz~20 kHz. FIG. 10 shows waveforms of the ramp signal $V_W$ and the burst signal $V_G$, in which the on time $T_{ON}$ of the burst signal is fixed. The off time $T_{OFF}$ of the burst signal $V_G$ is modulated by the feedback signal.

Figure 11:
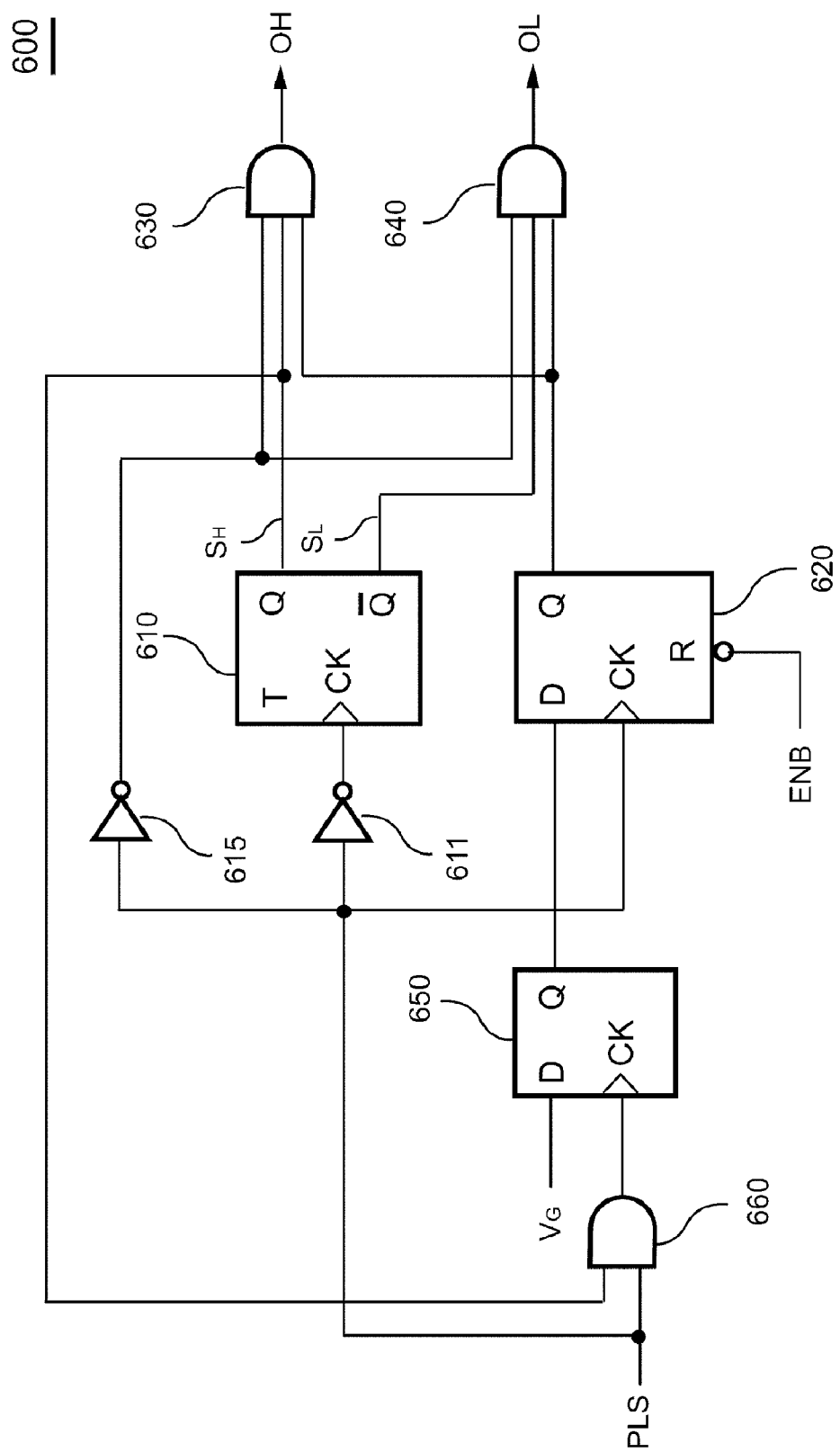
FIG. 11 shows a control circuit for generating switching signals according to the present invention.

FIG. 11 shows the control circuit 600. It includes a T flip-flop 610, D flip-flops 620, 650, AND gates 630, 640, 660 and inverters 611, 615. The oscillation signal PLS is connected to set the D flip-flop 620 and trigger the T flip-flop 610 via an inverter 611. Through an inverter 615, the oscillation signal PLS is further connected to AND gates 630 and 640 to limit the maximum on time of switching signals OH and OL. The T flip-flop 610 alternately generates an output signal $S_H$ or an output signal $S_L$ in response to the oscillation signal PLS. The output signal $S_H$ and the output signal $S_L$ are connected to AND gates 630 and 640 respectively. The AND gate 660 is coupled to receive the oscillation signal PLS and the output signal $S_H$. The output of the AND gate 660 is connected to set the D flip-flop 650. The D-input of the D flip-flop 650 is connected to the burst signal $V_G$. The output of the D flip-flop 650 is connected to the D-input of the D flip-flop 620. The output of the D flip-flop 620 is connected to AND gates 630 and 640. The output of the AND gate 630 generates the switching signal OH. The output of the AND gate 640 generates the switching signal OL. The enable signal ENB is coupled to reset the D flip-flop 620 for turning off switching signals OH and OL when the enable signal ENB is disabled. The burst signal $V_G$ is utilized to enable or disable of switching signals OH, OL, which is synchronized with the oscillation signal PLS.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A switching controller of a resonant power converter, comprising:
    a feedback circuit coupled to a feedback terminal to receive a feedback signal for generating an adjustment signal;
    a minimum-frequency programming circuit coupled to a minimum-frequency programming terminal to generate a first current signal for determining a minimum switching frequency of the power converter;
    a maximum-frequency programming circuit coupled to a maximum-frequency programming terminal to generate a second current signal in response to the adjustment signal to determine a maximum switching frequency of the power converter; and
    an oscillation circuit generating an oscillation signal in response to the first signal and the second signal;
    wherein the oscillation signal determines a switching frequency of the power converter.

2. The switching controller as claimed in claim 1, further comprising:
    a feed-forward circuit coupled to a feed-forward terminal to receive a feed-forward signal representing an input voltage of the power converter;
    wherein the feed-forward signal is coupled to modulate the switching frequency of the power converter.

3. The switching controller as claimed in claim 1, wherein the switching frequency is increased in response to decrease of the feedback signal, and the switching frequency is increased in response to the increase of the feed-forward signal.

4. The switching controller as claimed in claim 1, further comprising:
    a soft-start circuit coupled to a soft-start terminal to receive a soft-start signal;
    wherein the soft-start signal is coupled to program the adjustment signal.

5. The switching controller as claimed in claim 1, further comprising:
    a power management circuit coupled to a power-level programming terminal to receive a power-level signal for generating a burst signal;
    wherein the burst signal is generated once the feedback signal is lower than a light-load threshold; the light-load threshold is determined by the power-level signal; the burst signal is coupled to on/off a switching signal of the power converter.

6. The switching controller as claimed in claim 5, in which the burst signal is linearly modulated in response to the change of the load of the power converter.

7. The switching controller as claimed in claim 5, wherein an enable time of the burst signal is fixed and a disable time of the burst signal is modulated in response to the change of the feedback signal.

8. The switching controller as claimed in claim 5, wherein the burst signal is disabled when frequency of the burst signal is between a first frequency and a second frequency.

9. The switching controller as claimed in claim 1, further comprising:
    a monitoring circuit coupled to a protection input terminal to generate an over-voltage signal; and
    a time-delay circuit coupled to initiate a first time delay in response to the over-voltage signal;
    wherein the over-voltage signal is generated when voltage of the protection input terminal is higher than an over-voltage threshold; the time-delay circuit generates a protection signal to disable the switching signal of the power converter once the first time delay is expired.

10. The switching controller as claimed in claim 9, in which the time delay circuit initiates a second time delay once the protection signal is generated; the protection signal is reset once the second time delay is expired; wherein the period of the second time delay is longer than the period of the first time delay.

11. A switching control circuit of a power converter, comprising:
    a feedback circuit coupled to a feedback terminal to receive a feedback signal for generating an adjustment signal;
    a minimum-frequency programming circuit coupled to generate a first signal for determining a minimum switching frequency of the power converter;
    a maximum-frequency programming circuit coupled to generate a second signal in response to the adjustment signal to determine a maximum switching frequency of the power converter;
    a feed-forward circuit coupled to receive a feed-forward signal representing the input voltage of the power converter; and
    an oscillation circuit generating an oscillation signal in response to the first signal and the second signal;
    wherein the feed-forward signal is coupled to modulate the oscillation signal; the oscillation signal determines a switching frequency of the power converter.

12. The switching control circuit as claimed in claim 11, wherein the switching frequency is increased in response to decrease of the feedback signal; the switching frequency is increased in response to the increase of the feed-forward signal.

13. The switching control circuit as claimed in claim 11, further comprising:
    a power management circuit coupled to generate a burst signal;
    wherein the burst signal is coupled to on/off a switching signal of the power converter; the burst signal is generated once the feedback signal is lower than a light-load threshold; in which an enable time of the burst signal is fixed and a disable time of the burst signal is modulated in response to the change of the feedback signal.

14. The switching control circuit as claimed in claim 13, wherein the burst signal is disabled when the frequency of the burst signal is operated between a first frequency and a second frequency.

15. The switching control circuit as claimed in claim 11, further comprising:
 a monitoring circuit coupled to a protection input terminal to generate an over-voltage signal; and
 a time-delay circuit coupled to initiate a first time delay in response to the over-voltage signal;
 wherein the over-voltage signal is generated when the voltage of the protection input terminal is higher than an over-voltage threshold; and the time-delay circuit generates a protection signal to disable a switching signal of the power converter once the first time delay is expired.

16. The switching control circuit as claimed in claim 15, in which the time delay circuit initiates a second time delay once the protection signal is generated; the protection signal is reset once the second time delay is expired; wherein the period of the second time delay is longer than the period of the first time delay.

17. A control circuit of a power converter, comprising:
 a feedback circuit coupled to a feedback terminal to receive a feedback signal for generating an adjustment signal;
 a minimum-frequency programming circuit coupled to generate a first signal for determining a minimum switching frequency of the power converter;
 a maximum-frequency programming circuit coupled to generate a second signal in response to the adjustment signal to determine a maximum switching frequency of the power converter;
 an oscillation circuit generating an oscillation signal in response to the first signal and the second signal; and
 a power management circuit coupled to generate a burst signal in response to the feedback signal;
 wherein the oscillation signal determines a switching frequency of the power converter; and
 the burst signal is coupled to on/off a switching signal of the power converter.

18. The control circuit as claimed in claim 17, wherein the burst signal is generated once the feedback signal is lower than a light-load threshold; in which an enable time of the burst signal is fixed and a disable time of the burst signal is modulated in response to the change of the feedback signal; the burst signal is disabled when the frequency of the burst signal is between a first frequency and a second frequency.

19. The control circuit as claimed in claim 17, further comprising:
 a feed-forward circuit coupled to receive a feed-forward signal representing the input voltage of the power converter;
 wherein the feed-forward signal is coupled to modulate the switching frequency of the power converter.

20. The control circuit as claimed in claim 19, wherein the switching frequency is increased in response to decrease of the feedback signal; the switching frequency is increased in response to the increase of the feed-forward signal.

21. The control circuit as claimed in claim 17, further comprising:
 a monitoring circuit coupled to a protection input terminal to generate an over-voltage signal; and
 a time-delay circuit coupled to initiate a first time delay in response to the over-voltage signal;
 wherein the over-voltage signal is generated when the voltage of the protection input terminal is higher than an over-voltage threshold; the time-delay circuit generates a protection signal to disable the switching signal of the power converter once the first time delay is expired.

22. The control circuit as claimed in claim 21, in which the time delay circuit initiates a second time delay once the protection signal is generated; the protection signal is reset once the second time delay is expired; wherein the period of the second time delay is longer than the period of the first time delay.

* * * * *